United States Patent
Macbeth

(10) Patent No.: US 6,670,870 B2
(45) Date of Patent: Dec. 30, 2003

(54) LOCKOUT FOR RESET MECHANISM OF ELECTRICAL PROTECTIVE DEVICE

(75) Inventor: Bruce F. Macbeth, Syracuse, NY (US)

(73) Assignee: Pass & Seymour, Syracuse, NY (US)

( * ) Notice: Subject to any disclaimer, the term of this patent is extended or adjusted under 35 U.S.C. 154(b) by 0 days.

(21) Appl. No.: 10/308,549

(22) Filed: Dec. 3, 2002

(65) Prior Publication Data

US 2003/0080837 A1 May 1, 2003

Related U.S. Application Data

(62) Division of application No. 09/827,007, filed on Apr. 5, 2001
(60) Provisional application No. 60/195,037, filed on Apr. 6, 2000.

(51) Int. Cl.[7] .............................................. H01H 77/00
(52) U.S. Cl. ............................ 335/6; 335/18; 335/21; 335/23; 335/24; 335/25; 361/103; 361/42
(58) Field of Search ............................... 335/18, 21–26, 335/6–7; 361/130

(56) References Cited

U.S. PATENT DOCUMENTS

| | | | |
|---|---|---|---|
| 4,392,118 A | * | 7/1983 | Kolb et al. ................. 337/154 |
| 4,409,574 A | | 10/1983 | Misencik et al. |
| 4,837,545 A | * | 6/1989 | Cobb, III et al. ............. 337/66 |
| 4,851,951 A | | 7/1989 | Foster, Jr. |
| 4,903,160 A | | 2/1990 | Elmore et al. |
| 5,202,662 A | * | 4/1993 | Bienwald et al. ............. 335/18 |
| 5,223,810 A | | 6/1993 | Van Haaren |
| 5,397,948 A | * | 3/1995 | Zoerner et al. ............... 310/46 |
| 5,541,800 A | * | 7/1996 | Misencik ..................... 361/45 |
| 6,472,882 B1 | * | 10/2002 | Tiemann et al. ............ 324/509 |

* cited by examiner

Primary Examiner—Ramon M. Barrera
Assistant Examiner—Bernard Rojas
(74) Attorney, Agent, or Firm—Wall Marjama & Bilinski LLP

(57) ABSTRACT

An electrical protective device that includes a reset mechanism uses a resistor body to act as a hold-off to a spring driven lockout for the reset mechanism. Upon the failure of an internal component of the protective device, the spring driven lockout mechanism is released by $I^2R$ thermal action which causes a resistor to burn in half, or in the alternative, to melt solder mounting the resistor, thereby eliminating the hold-off and locking out the reset mechanism.

6 Claims, 8 Drawing Sheets

LOCKOUT FOR RESET MECHANISM OF ELECTRICAL PROTECTIVE DEVICE

CROSS-REFERENCE TO RELATED APPLICATIONS

This application is a division of application No. 09/827,007 filed Apr. 5, 2001, which claims priority from U.S. Provisional Application Ser. No. 60/195,037 filed Apr. 6, 2000 and entitled LOCKOUT MECHANISM FOR USE WITH GROUND AND ARC FAULT CIRCUIT INTERRUPTERS, incorporated herein by reference.

FIELD OF THE INVENTION

This invention relates generally to the field of lockout mechanisms for electrical protective devices, and more particularly to a lockout device for use with a ground fault circuit interrupter or an arc fault circuit interrupter.

BACKGROUND OF THE INVENTION

Electrical protective devices such as ground fault circuit interrupters, arc fault circuit interrupters, circuit breakers, etc. are designed to trip when a fault condition occurs. The trip mechanism used to mechanically break the circuit connection between the input and output conductors typically includes a solenoid. A test button tests the circuitry and trip mechanism while a reset button is used to reset the electrical connection between the input and output conductors. In some devices, the device is capable of being reset even if internal components have failed.

SUMMARY OF THE INVENTION

Briefly stated, an electrical protective device that includes a reset mechanism uses a resistor body to act as a hold-off to a spring driven lockout for the reset mechanism. Upon the failure of an internal component of the protective device, the spring driven lockout mechanism is released by $I^2R$ thermal action which causes a resistor to burn in half, or in the alternative, to melt solder mounting the resistor, thereby eliminating the hold-off and locking out the reset mechanism.

According to an embodiment of the invention, a lockout for a reset mechanism of an electrical protective device includes a spring biasing the lockout; a resistor body which holds the lockout in a first position against action of the spring, wherein the first position permits resetting the electrical protective device; and a switch responsive to an internal fault in the electrical protective device, wherein activation of the switch sends a current through the resistor body; wherein when the resistor body reaches a predetermined temperature, the resistor body ceases to hold the lockout in the first position, whereby the lockout moves to a second position by action of the spring, and wherein the second position prevents resetting of the electrical protective device.

According to an embodiment of the invention, a lockout for a reset mechanism of an electrical protective device includes a resistor body which holds the lockout in a first position, wherein the first position permits resetting the electrical protective device; means, responsive to an internal fault in the electrical protective device, for sending a current through the resistor body; and means, responsive to the resistor body reaching a predetermined temperature, for moving the lockout to a second position, wherein the second position prevents resetting of the electrical protective device.

According to an embodiment of the invention, a lockout for a reset mechanism of an electrical protective device includes a reset mechanism which is biased by a reset spring; a lockout spring; a resistor body which holds the lockout spring in a first position against action of the lockout spring, wherein the first position permits resetting the electrical protective device; and a switch responsive to an internal fault in the electrical protective device, wherein activation of the switch sends a current through the resistor body; wherein when the resistor body reaches a predetermined temperature, the resistor body ceases to hold the lockout spring in the first position, whereby the lockout spring moves to a second position, and wherein the second position prevents resetting of the electrical protective device.

According to an embodiment of the invention, a method for locking out a reset mechanism of an electrical protective device includes the steps of providing a spring driven lockout for the reset mechanism; providing a resistor body which holds the lockout in a first position, wherein the first position permits resetting the electrical protective device; sending a current through the resistor body in response to an internal fault in the electrical protective device; and moving the lockout to a second position in response to the resistor body reaching a predetermined temperature, wherein the second position prevents resetting of the electrical protective device.

According to an embodiment of the invention, a lockout for a reset mechanism of an electrical protective device includes a spring biasing the lockout; a resistor body which holds the lockout in a first position against action of the spring, wherein the first position permits resetting the electrical protective device; and a current path responsive to an internal fault in the electrical protective device, wherein activation of the current path sends a current through the resistor body; wherein when the resistor body reaches a predetermined temperature, the resistor body ceases to hold the lockout in the first position, whereby the lockout moves to a second position by action of the spring, and wherein the second position prevents resetting of the electrical protective device.

According to an embodiment of the invention, a lockout for a reset mechanism of an electrical protective device includes a spring biasing against a resistor body, wherein an electrical current through the resistor body maintains lockout; the resistor body reaching a predetermined temperature when the current has sufficient energy from a duration or magnitude of the current; when the resistor body reaches the predetermined temperature, the biasing of the spring displaces the resistor body such that electrical current through the resistor body is interrupted, wherein the interruption permits resetting the reset mechanism.

According to an embodiment of the invention, a lockout for a reset mechanism of an electrical protective device includes a spring biasing the lockout; a resistor body which holds the lockout in a first position against action of the spring, wherein the first position permits resetting the electrical protective device; means for sending a current through the resistor body in response to an internal fault in the electrical protective device; wherein when the resistor body reaches a predetermined temperature, the resistor body ceases to hold the lockout in the first position, and the lockout moves to a second position by action of the spring; and wherein the second position prevents resetting of the electrical protective device.

According to an embodiment of the invention, a lockout for a reset mechanism of an electrical protective device includes a spring biasing the lockout; an electrical component which holds the lockout in a first position against action of the spring, wherein the first position permits resetting the electrical protective device; means for sending a current through the electrical component in response to an internal fault in the electrical protective device; wherein when the electrical component reaches a predetermined temperature, the electrical component ceases to hold the lockout in the first position, and the lockout moves to a second position by action of the spring; and wherein the second position prevents resetting of the electrical protective device.

According to an embodiment of the invention, a lockout for a reset mechanism of an electrical protective device includes a hold-off body which holds the lockout in a first position, wherein the first position permits resetting the electrical protective device, the hold-off body being affixed to a part of the electrical protective device with a compound having a melting point; an electrical component of the electrical protection device being adjacent the hold-off body; means, responsive to an internal fault in the electrical protective device, for sending a current through the electrical component; and means, responsive to the electrical component reaching the melting point of the compound, for moving the lockout to a second position, wherein the second position prevents resetting of the electrical protective device.

According to an embodiment of the invention, a lockout for a reset mechanism of an electrical protective device includes a resistor body which holds the lockout in a first position, wherein the first position prevents resetting the electrical protective device; means, responsive to correctly wiring a supply voltage to the electrical protective device, for sending a current through the resistor body; and means, responsive to the resistor body reaching a predetermined temperature, for moving the lockout to a second position, wherein the second position permits resetting of the electrical protective device.

DETAILED DESCRIPTION OF THE PREFERRED EMBODIMENT

Figure 1:
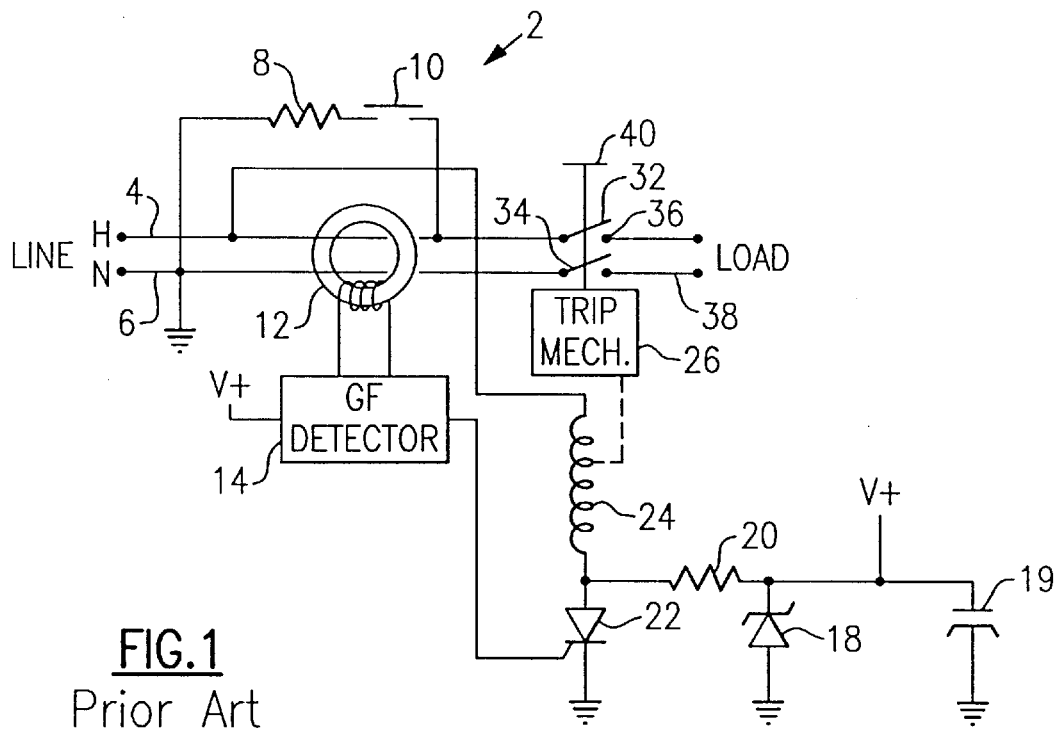
FIG. 1 shows a schematic for a GFCI according to the prior art.

Referring to FIG. 1, a prior art GFCI 2 includes a sensor 12 which senses ground faults which are then detected by a ground fault detector 14. Detector 14 issues a trip command to an SCR 22 which in turn activates a solenoid 24, which activates a trip mechanism 26 releasing contact armatures 34 and 32, thereby disconnecting power to the load by breaking the circuit from a line hot 4 to a load hot 36 and from a line neutral 6 to a load neutral 38. A contact 10 along with a resistor 8 form a test circuit which introduces a simulated ground fault. When contact 10 is depressed, a simulated ground fault is introduced into the circuitry which is sensed by the device causing the device to trip. The device is reset by pressing a reset button 40 which mechanically resets trip mechanism 26. A resistor 20, a Zener 18, and a capacitor 19 form a power supply for the GFCI.

Figure 2:
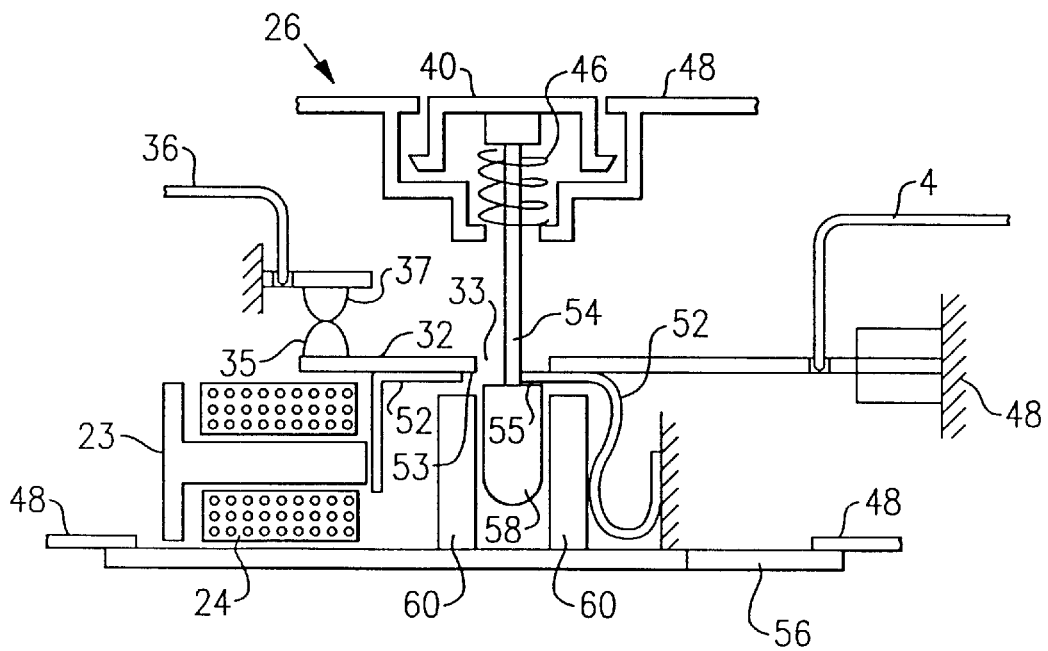
FIG. 2 shows a partial sectional view of a prior art mechanical implementation of the circuit of FIG. 1.

Referring to FIG. 2, the mechanical layout for the schematic of FIG. 1 is shown in which like elements are like numbered. Trip mechanism 26 is shown in the set state, meaning that contacts 37 and 35 are closed. Contacts 35 and 37 are held closed by action of a trapped make-force spring 46 acting on a reset stem 54 to lift a reset latch spring 52, and by interference, an armature 32. Reset latch spring 52 includes a hole 53 and armature 32 includes a hole 33, which holes 33, 53 permit entry of a tip 58 of reset stem 54. Reset stem 54 is held in place by a block 60. Armature 32 and a printed circuit board (PCB) 56 are mechanically referenced to a housing 48 so that the force in spring 46 is concentrated into armature 32.

Figure 3:
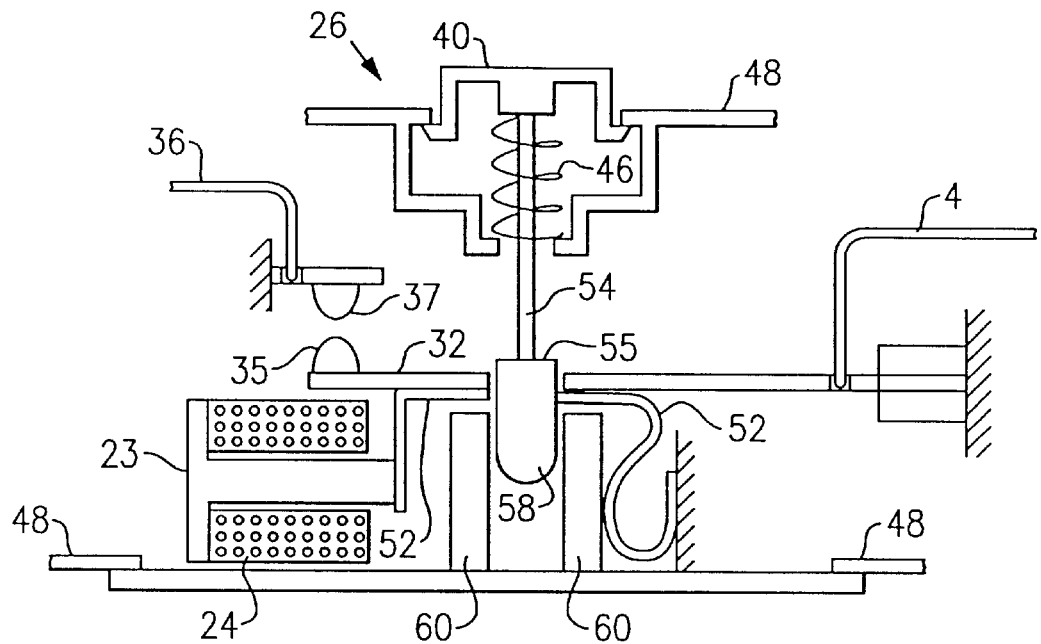
FIG. 3 shows the mechanical implementation of FIG. 2 in a tripped state.

Referring to FIG. 3, the mechanism of FIG. 2 is shown in the tripped state. The tripped state occurs when SCR 22 activates solenoid 24, which in turn pulls in plunger 23 to displace latch spring 52. Displacing latch spring 52 allows a flat portion 55 to clear the latch spring 52 interference, which then releases the interference between latch spring 52 and armature 32. Armature 32 has a memory which returns armature 32 to a resting position against solenoid 24, opening contacts 35 and 37 and disconnecting power to the load.

Figure 4:
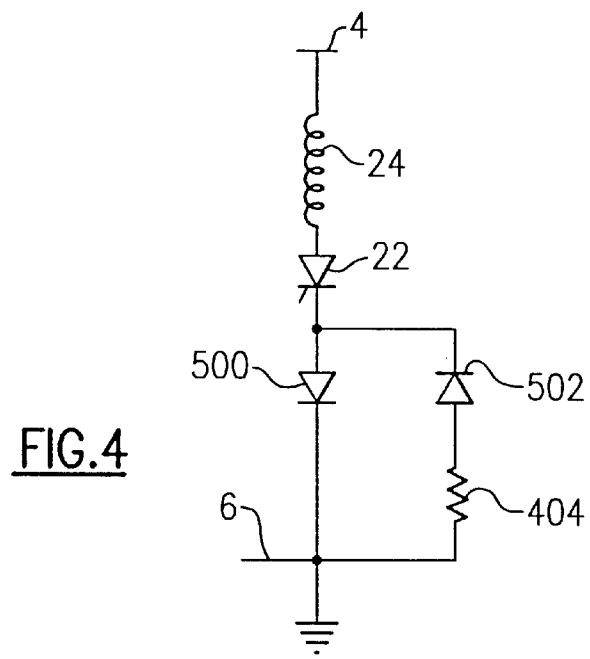
FIG. 4 shows a schematic for a lockout mechanism for a GFCI according to an embodiment of the invention.

Referring to FIG. 4, a schematic of the circuit which activates a thermal release resistor 404 according to an embodiment of the invention is shown. In a typical failure mode of GFCI's, SCR 22 is shorted from lightning surges.

In normal SCR 22 conduction, SCR 22 rectified current flows from line hot 4, through solenoid 24, and through a diode 500, activating solenoid 24 and tripping out the device as previously above. A diode 502 is reverse biased to the current rectified by SCR 22 and does not conduct. When a shorted SCR occurs, solenoid 24 is activated, releasing armature 32 and contacts 35 and 37 into the open tripped state as previously explained. A negative half cycle current flows from line neutral 6 through thermal release resistor 404, now conducting diode 502, and the shorted SCR 22 which no longer blocks negative half cycle current.

Figure 5:
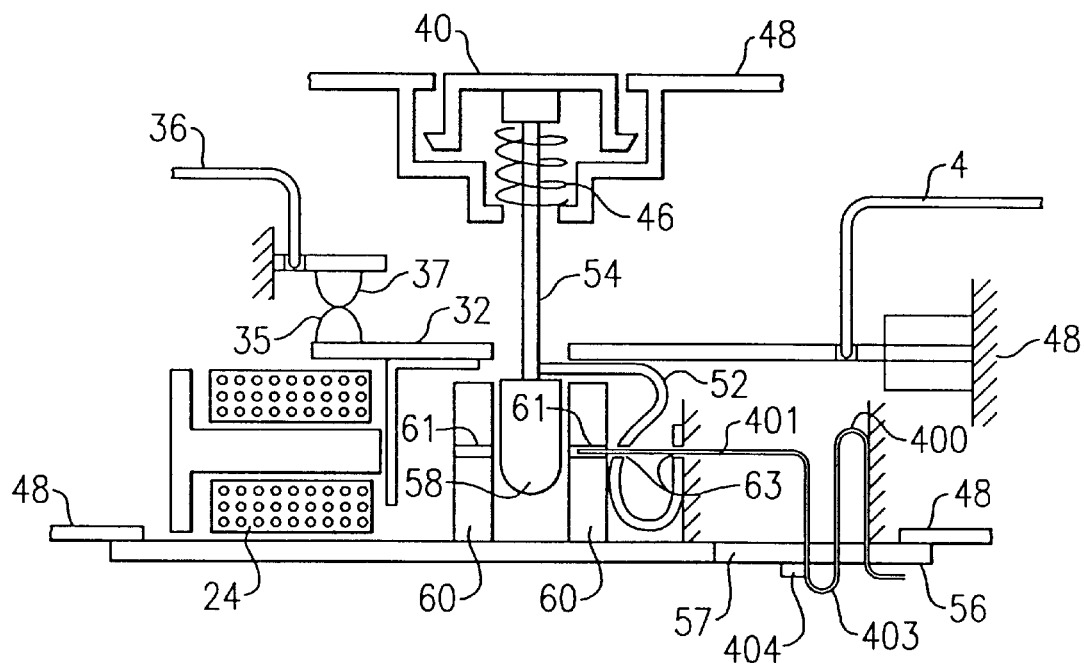
FIG. 5 shows a partial sectional view of a mechanical implementation of an embodiment of the invention.

Referring to FIG. 5, a physical embodiment of the schematic of FIG. 4 is shown, which is similar to the embodiment of FIG. 2 but with a lockout spring 400 added. A plurality of holes 61 in a block 60 and a plurality of holes 63 in latch spring 52 receive an end 401 of lockout spring 400. Holes 63 are such that they don't block the normal trip and reset functions of reset latch spring 52. A slot 57 in PCB 56 receives an end 403 of lockout spring 400 which is restrained by thermal release resistor 404. Thermal release resistor 404 is preferably mounted and soldered so that the body of resistor 404 crosses slot 57, with solder pads for resistor 404 on each side of slot 57 disposed in such a way as to impede movement of lockout spring 400. When resistor 404 heats and melts its solder pads, lockout spring 400 moves resistor 404 off its solder pads.

Figure 6:
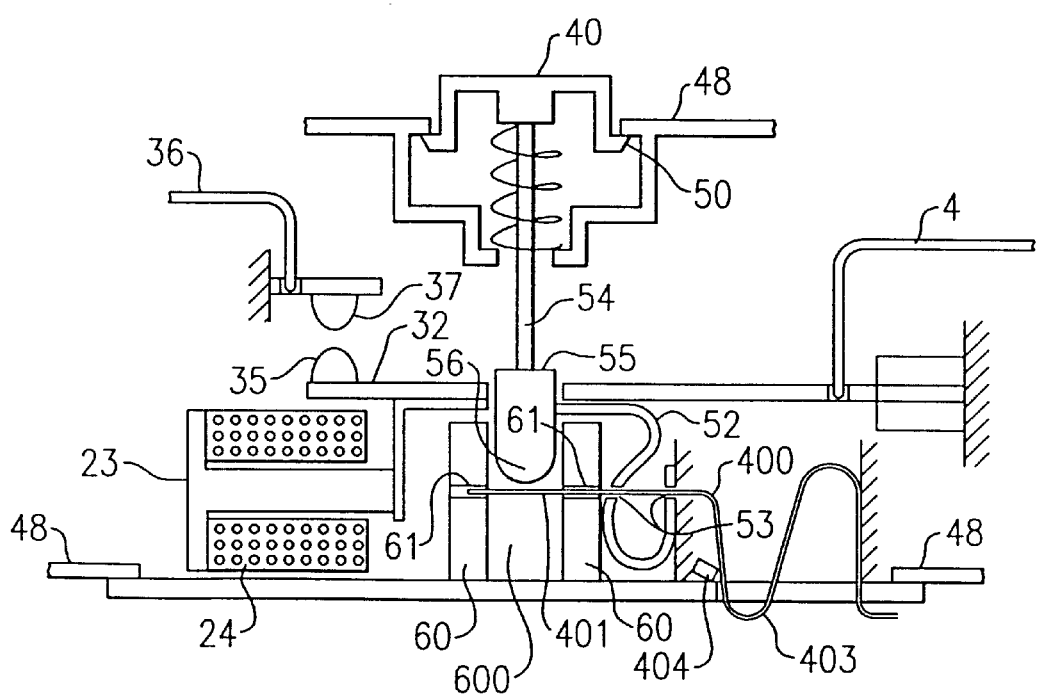
FIG. 6 shows the mechanical implementation of FIG. 5 in a tripped and locked out state.

Referring also to FIG. 6, the mass and resistance of thermal release resistor 404 is set for rapid heating of resistor 404, which melts the solder pads of resistor 404, thereby releasing end 403 of lockout spring 400 into the state shown in FIG. 6. End 401 of lockout spring 400 blocks channel 600 in block 60 preventing a reset of the GFCI. In this way, a failure of SCR 22 through shorting locks out the GFCI from being reset when the GFCI can no longer detect and prevent electrocution.

Figure 7:
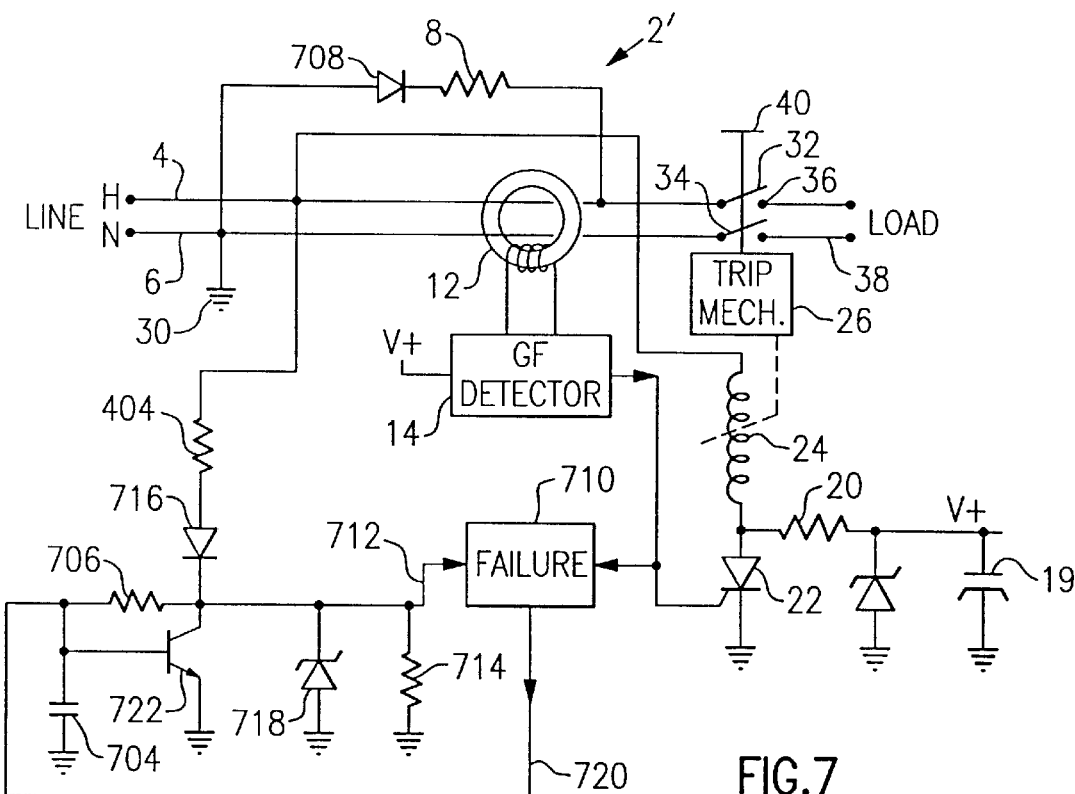
FIG. 7 shows a schematic for a lockout mechanism for a GFCI according to an embodiment of the invention.

Referring to FIG. 7, an embodiment is shown of a GFCI 2' which adds a failure block 710 to the schematic of FIG. 1. Failure block 710 uses a reference voltage 712 which detects the line voltage negative half cycle by the action of a diode 716. Diode 716 rectifies the line voltage and creates a half-wave voltage by way of the voltage divider formed from thermal release resistor 404 and a resistor 714. The half-wave voltage is clamped by a Zener 718. The current which flows through thermal release resistor 404 in this mode is not sufficient to heat and release the spring-biased resistor 404 from its solder pads. However, when SCR 22 is shorted, this embodiment provides sufficient current to resistor 404 to heat its solder pads to free resistor 404 for movement, as will now be explained.

A test circuit preferably consisting of resistor 8 and a diode 708 connects the load hot side of sensor 12 to the neutral line side of sensor 12 and introduces a simulated ground fault during the negative line half cycle when SCR 22 is reverse biased and cannot conduct. The action of the simulated ground fault during the negative half cycle is detected by detector 14 which issues a trip command to gate 28 of SCR 22. This trip command has no effect as the SCR 22 cannot conduct during the negative half cycle. The trip command to the SCR 22 gate 28 is used as an input to failure detect block 710 which acts on the trip command to keep an output line 720 LOW which is connected to a base of an NPN transistor 722. This prevents transistor 722 from conducting rectified line current through thermal release resistor 404. If block 710 detects an absence of the SCR 22 gate pulse during the negative half cycle, thereby indicating a GFCI component failure, then output 720 is allowed to float. This allows the base drive current of transistor 722 through resistor 706 to cause transistor 722 to conduct sufficient current to heat and release thermal release resistor 404 from its solder pads. A capacitor 704 is used for power up conditions to hold transistor 722 OFF.

Figure 8:
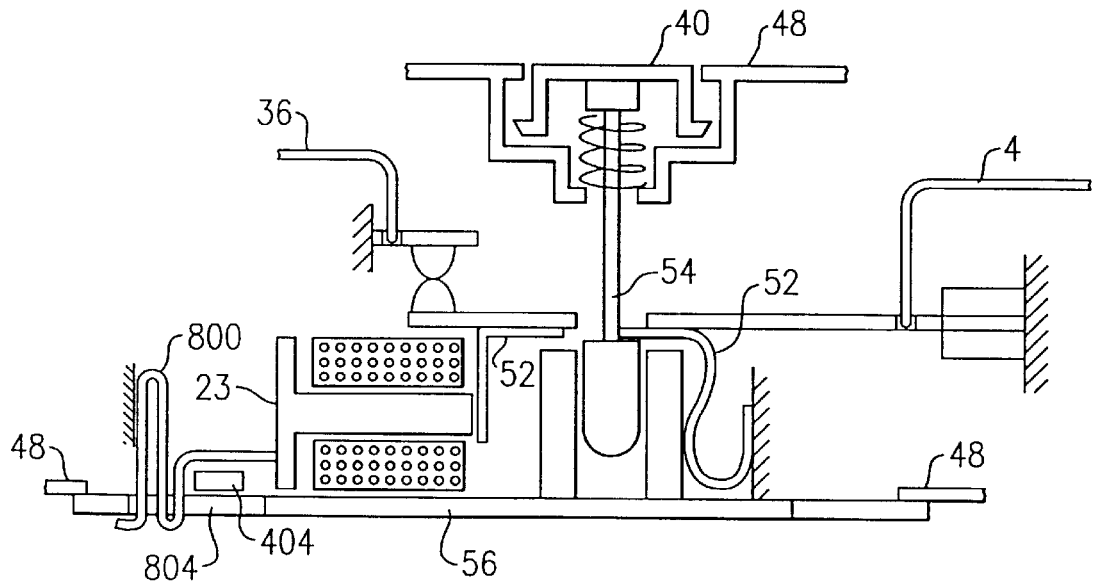
FIG. 8 shows a partial sectional view of a mechanical implementation of an embodiment of the invention.
Figure 9:
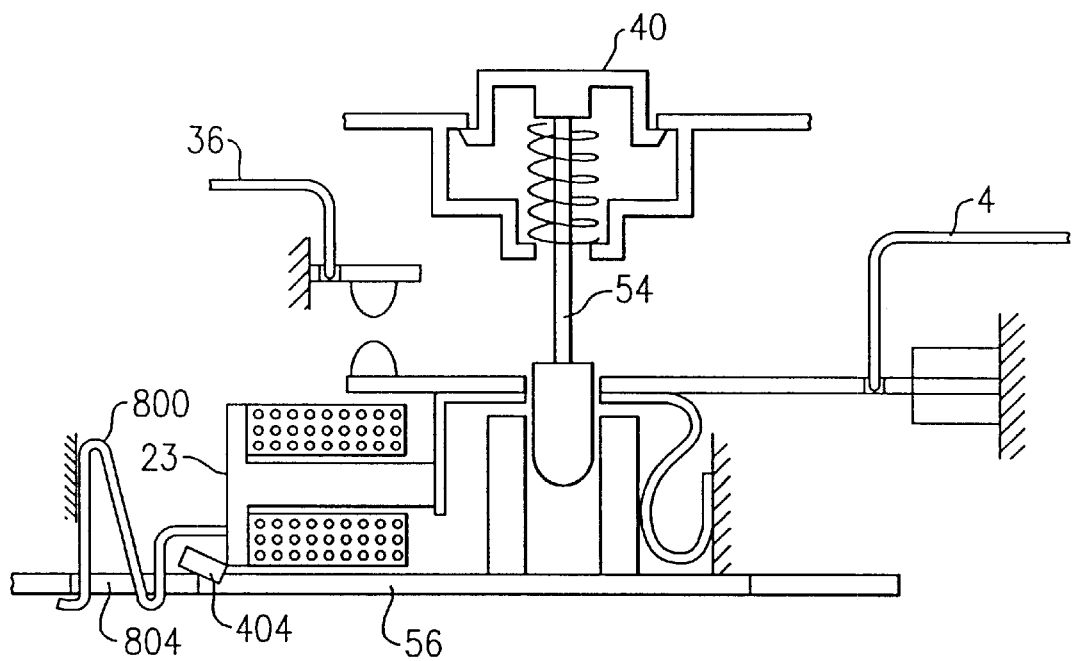
FIG. 9 shows the mechanical implementation of FIG. 8 in a tripped and locked out state.

FIGS. 8–9 show an embodiment with a different location for a lockout spring 800. Lockout spring 800 is preferably in a slot 804, which when released by thermal release resistor 404, pushes plunger 23 into the seated trip out state (FIG. 9) without requiring the activation of SCR 24 or solenoid 24. In this manner, the GFCI can self test and trip out, disconnecting power from the load, even if SCR 22 or solenoid 24 are defective.

Figure 10:
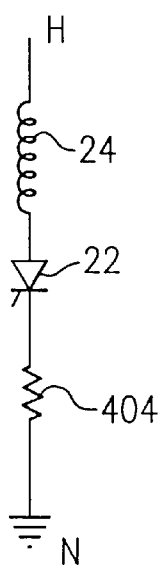
FIG. 10 shows a schematic for a lockout mechanism for a GFCI according to an embodiment of the invention.

Referring to FIG. 10, an alternate location for thermal release resistor 404 is shown in which resistor 404 is in series with SCR 22. In this mode, normal activation of SCR 22 and solenoid 24 does not cause enough heating action of resistor 404 to release the spring loaded resistor 404 from its pads, but a sustained heating from the current in the event of a shorted SCR 22 melts the resistor 404 solder pads before SCR 22 or solenoid 24 burns open from over activation.

Figure 11:
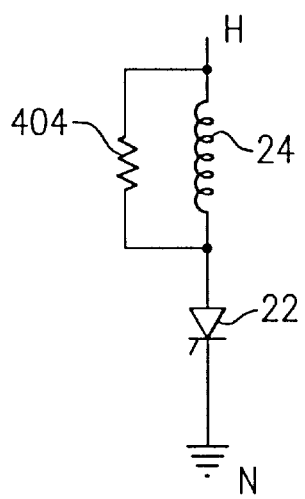
FIG. 11 shows a schematic for a lockout mechanism for a GFCI according to an embodiment of the invention.

Referring to FIG. 11, another location for thermal release resistor 404 is shown in which resistor 404 is in parallel with solenoid 24 in such a way so that normal activation of SCR 22, which causes current to flow through both solenoid 24 and resistor 404, is not for a long enough period to heat resistor 404 so that the solder pads melt, but when SCR 22 shorts, the increased period of current flow through resistor 404 releases it from its pads. This configuration has the advantage over the embodiment of FIG. 10 in that, if the solenoid burns open while SCR 22 is still shorted, parallel current continues to heat resistor 404. This allows for a longer time constant of heating for discrimination from the normal operation heating of resistor 404. Solenoid 24 burning open before SCR 22 burns open is the typical failure mode for SCR shorts in GFCI's.

Figure 12:
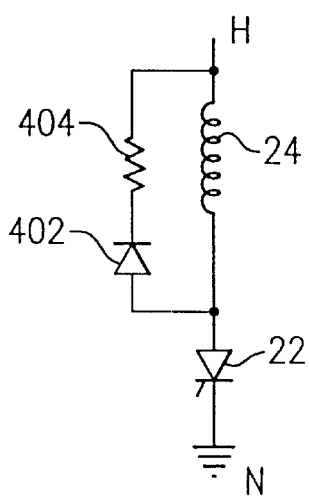
FIG. 12 shows a schematic for a lockout mechanism for a GFCI according to an embodiment of the invention.

Referring to FIG. 12, the embodiment shown is the same as the embodiment of FIG. 11 except that resistor 404 is connected in series with a diode 402 with the series string connected across solenoid 24. Diode 402 is connected so that it only conducts when SCR 22 shorts out which allows negative line cycle current to flow through diode 402 and thermal release resistor 404. In this way, resistor 404 is only heated when SCR 22 shorts.

Figure 13:
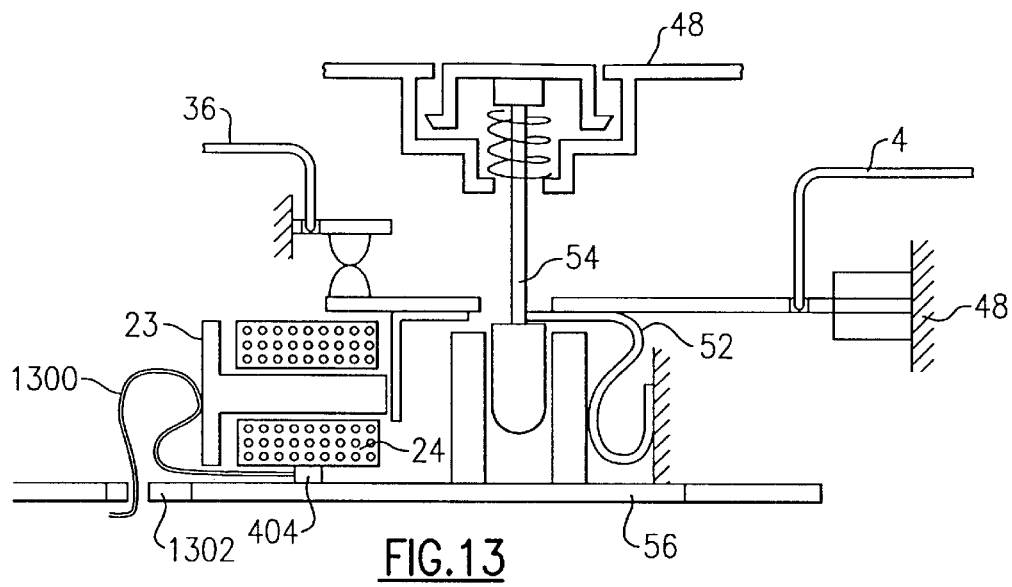
FIG. 13 shows a partial sectional view of a mechanical implementation of an embodiment of the invention.

Referring to FIG. 13, another embodiment is shown in which resistor 404 is placed adjacent solenoid 24 so that as solenoid 24 heats from a shorted SCR 22, the action of solenoid 24 conducts heat to resistor 404 to release it from its solder pads. At the same time, releasing resistor 404 from its solder pads releases a spring 1300, which is inserted in a slot 1302 of PCB 56, to push plunger 23 home and trip the GFCI device into lockout. In this configuration, epoxy or any type of glue could be used to either glue the end of spring 1300 to solenoid 24 or just act as a block to a release to spring 1300. The epoxy or glue could be substituted for resistor 404, in which the epoxy or glue melts and releases spring 1300 when solenoid 24 overheats from a shorted SCR 22.

Figure 14:
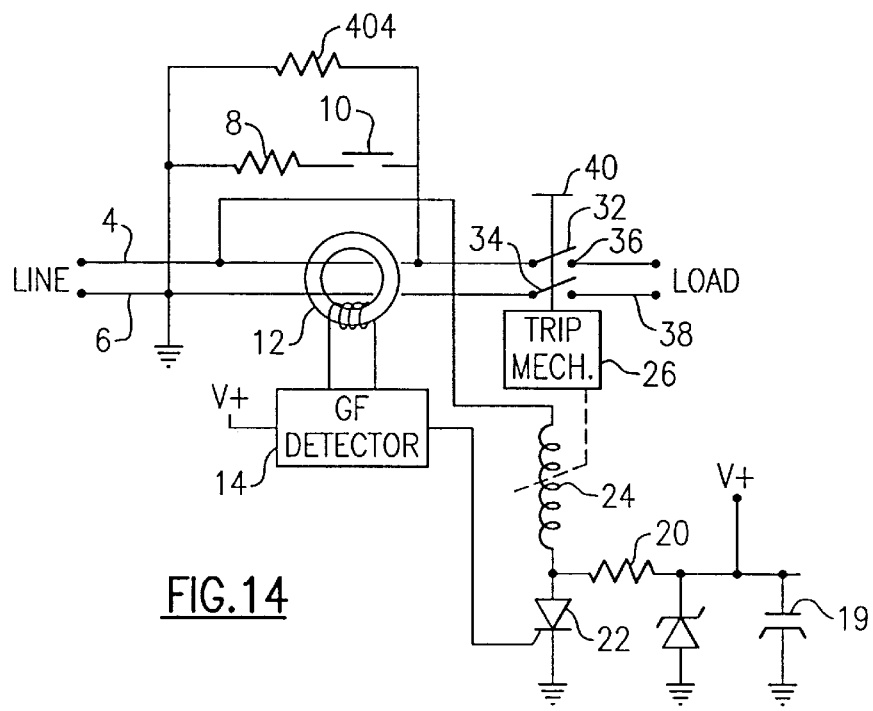
FIG. 14 shows a schematic for a miswire protection mechanism for a GFCI according to an embodiment of the invention.

Referring to FIG. 14, another embodiment is shown in which the spring loaded thermal release of thermal release resistor 404 causes lockout of the GFCI. FIG. 14 is similar to FIG. 1, except for the inclusion of thermal release resistor 404 as part of the ground fault simulator. When power is miswired to the load side of the GFCI and the GFCI is in the reset position, i.e., armatures 32, 34 are closed, a ground fault signal is immediately sensed by the current flowing through resistor 404 as a ground fault, which causes the immediate tripping open of the GFCI. When the GFCI trips open, the line voltage is disconnected from resistor 404, and any heating of resistor 404 ends since resistor 404 is on the other side of the open power contacts. The mass and size of resistor 404 is preferably selected so as not to melt the solder pads of resistor 404 during this action. This allows a miswire lockout of the GFCI, since the device cannot be reset without immediately tripping. When the device is correctly wired with power to the line side of the GFCI, the same miswire ground fault current through resistor 404 causes an immediate trip, but in this connection mode the line voltage remains across resistor 404 and heats resistor 404 until the solder pads melt.

Figure 15:
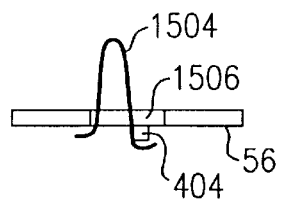
FIG. 15 shows a partial cross sectional view of a mechanical implementation of part of the circuit of FIG. 14.
Figure 16:
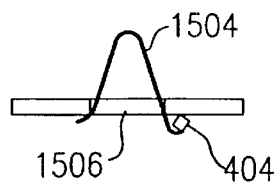
FIG. 16 shows a partial cross sectional view of a mechanical implementation of part of the circuit of FIG. 14.

Referring also to FIGS. 15–16, in the embodiment of FIG. 14, resistor 404 is soldered across a slot 1506 of PCB 56 and is loaded by a spring 1504 mounted in slot 1506 so as to push resistor 404 off its pads (FIG. 16) when the current flow through resistor 404 heats the pads. This action disconnects resistor 404 electrically from the circuit and ends the ground fault, allowing the device to be reset and operated normally. This action is much more repeatable than allowing resistor 404 to burn out, in the time until the miswire-detect ground fault is removed, as the action is more linear and predictable in the time it takes to move electrical energy into the body of resistor 404 and then from body of resistor 404 to the solder, since the solder melts at a precise temperature. Since GFCI's are permanently mounted devices, at least in those mountings susceptible to miswiring, the installer needs the lockout miswire protection only once at a miswired installation and after that the protection can be discarded as it is in this embodiment.

Figure 17A:
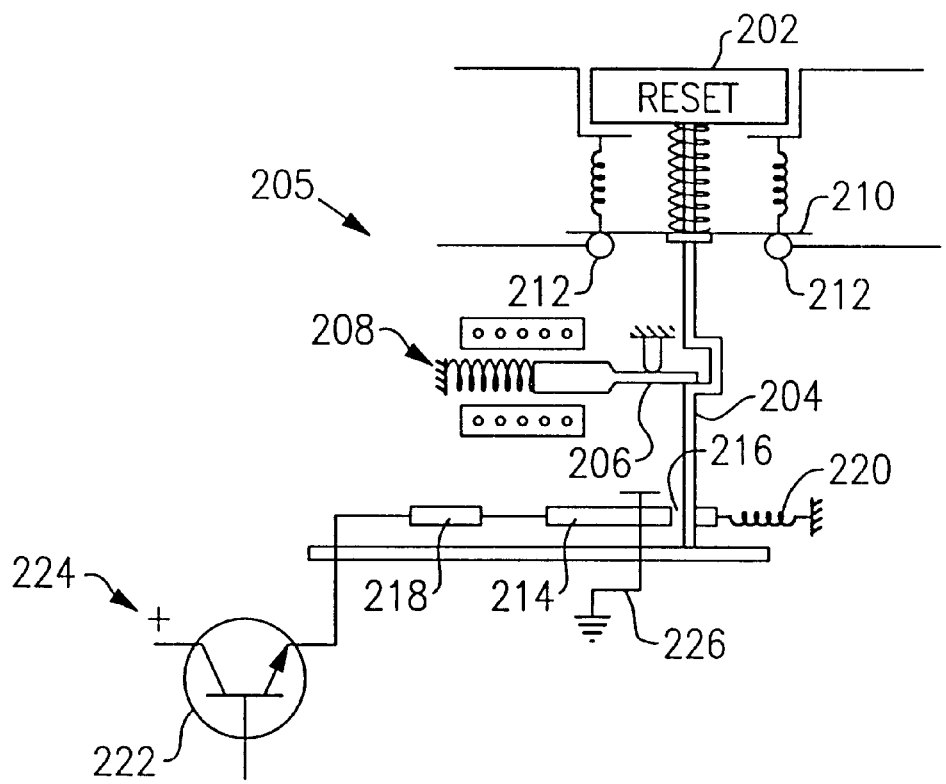
FIG. 17A shows a schematic view of a lockout mechanism according to an embodiment of the invention in a set state.
Figure 17B:
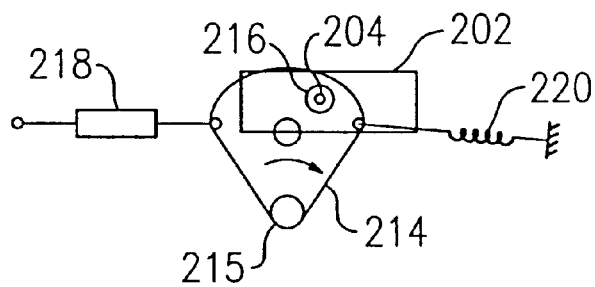
FIG. 17B shows a partial top view of the lockout mechanism of FIG. 1A.

Referring now to FIGS. 17A–17B, a trip mechanism 205 used in a protective device such as an AFCI (arc fault circuit interrupter) or GFCI (ground fault circuit interrupter) is shown in a set position. Pushing in a reset button 202 causes a reset stem 204 to lock into a plunger 206 of a solenoid 208. This action holds a buss bar 210 against a plurality of circuit interrupting contacts 212. A rotatable conductive lockout mechanism 214 is biased by a spring 220 but held in the proper (settable) orientation by a resistor 218. Lockout mechanism includes a hole 216 which, when properly aligned, allows reset stem 204 to enter hole 216, thus allowing a reset action. A transistor 222 connects to circuitry which detects a component failure in the protective device and activates transistor 222.

Figure 18A:
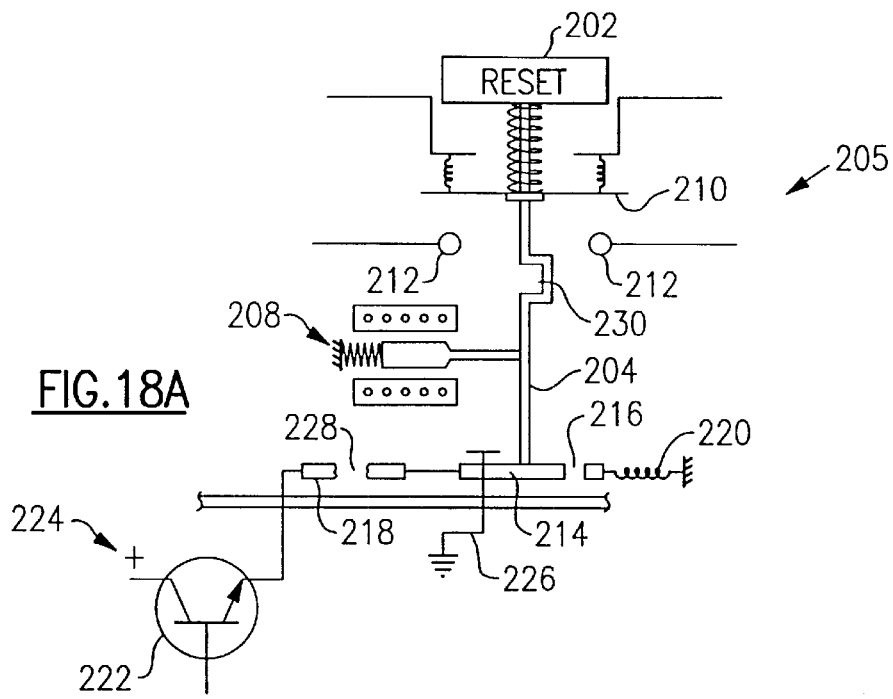
FIG. 18A shows a schematic view of a lockout mechanism according to an embodiment of the invention in a tripped and locked out state.
Figure 18B:
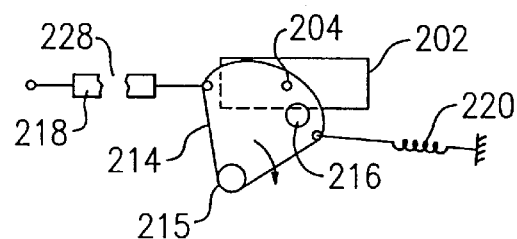
FIG. 18B shows a partial top view of the lockout mechanism of FIG. 2A.

Referring to FIGS. 18A–18B, when transistor 222 is activated by the failure of an internal component, current flows from a supply 224 through resistor 218 returning to supply 224 through conductive lockout mechanism 214 and a ground 226. This current causes resistor 218 to overheat and burn in half as shown at an opening 228. Once solenoid 208 is activated, thereby releasing reset stem 204 from a detent 230 and opening contacts 212, resistor 218 no longer holds lockout mechanism 214 in settable orientation, thus allowing spring 220 to rotate lockout mechanism 214 around a pivot 215 out of alignment with reset stem 204. Pressing reset button 202 no longer resets trip mechanism 205 due to the misalignment between reset stem 204 and hole 216 in lockout mechanism 214.

Figure 19A:
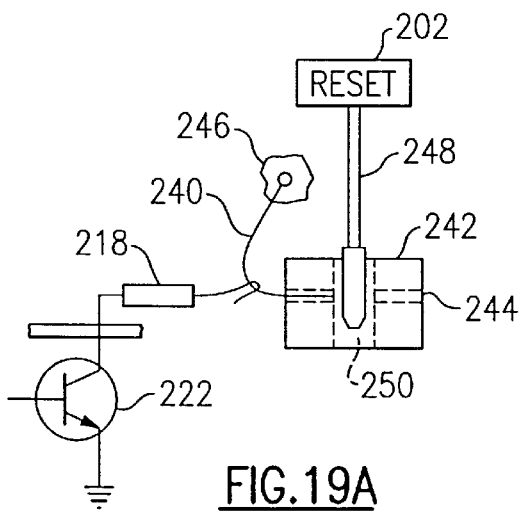
FIG. 19A shows an embodiment of the invention in a set position.
Figure 19B:
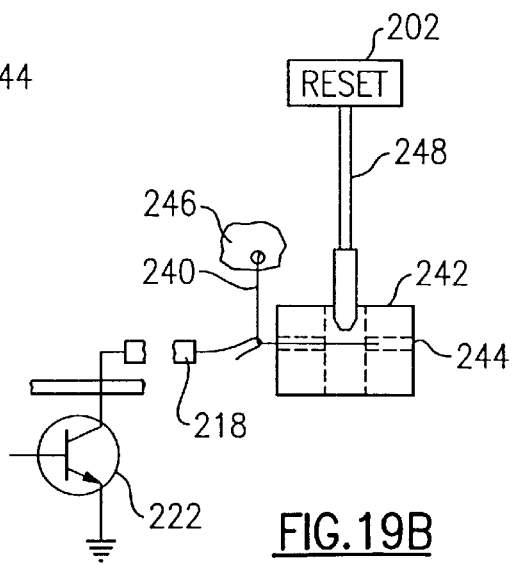
FIG. 19B shows the embodiment of FIG. 3A in a lockout position.

FIGS. 19A–19B show a variation of the embodiment shown in FIG. 17A whereby resistor 218 holds a bobby pin spring 240 out of a hole 244 of a reset block 242. Bobby spring 240 is preferably connected to the hot conductor of the wires the protective device is protecting. Pressing reset button 202 permits reset stem 248 to pass through a hole 250 in reset block 242. When transistor 222 is activated by the failure of an internal component, current passing from a PCB 246 through spring 240 and resistor 218 causes resistor 218 to burn in half, thereby releasing spring 240 into hole 244 as shown in FIG. 19B. When the reset button is in the tripped state, spring 240 acts as interference to reset stem 248, preventing a reset action and locking out the device.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A lockout for a reset mechanism of an electrical protective device, comprising:

a spring biasing against a resistor body, wherein an electrical current through said resistor body maintains lockout;

said resistor body reaching a predetermined temperature when said current has sufficient energy from a duration or magnitude of said current;

when said resistor body reaches said predetermined temperature, said biasing of said spring displaces said resistor body such that electrical current through said resistor body is interrupted, wherein said interruption permits resetting said reset mechanism.

2. A lockout according to claim 1, wherein said lockout is caused by miswiring a supply voltage to said electrical protective device, and said interruption occurs when said supply voltage is properly wired to said electrical protective device.

3. A lockout according to claim 1, wherein said resistor body is attached to a printed circuit board by solder, and when said resistor body reaches said predetermined temperature, said solder melts permitting said displacement of said resistor body.

4. A lockout according to claim 1, wherein said predetermined temperature causes said resistor body to weaken by burning.

5. A lockout for a reset mechanism of an electrical protective device, comprising:

a hold-off body which holds said lockout in a first position, wherein said first position permits resetting said electrical protective device, said hold-off body being affixed to a part of said electrical protective device with a compound having a melting point;

an electrical component of said electrical protection device being adjacent said hold-off body;

means, responsive to an internal fault in said electrical protective device, for sending a current through said electrical component; and means, responsive to said electrical component reaching said melting point of said compound, for moving said lockout to a second position, wherein said second position prevents resetting of said electrical protective device.

6. A lockout for a reset mechanism of an electrical protective device, comprising:

a resistor body which holds said lockout in a first position, wherein said first position prevents resetting said electrical protective device;

means, responsive to correctly wiring a supply voltage to said electrical protective device, for sending a current through said resistor body; and means, responsive to said resistor body reaching a predetermined temperature, for moving said lockout to a second position, wherein said second position permits resetting of said electrical protective device.

\* \* \* \* \*